United States Patent [19]

Rivier

[11] 3,888,929
[45] June 10, 1975

[54] PROCESS FOR DEHALOGENATION OF POLYHALOGENATED AROMATIC COMPOUNDS

[75] Inventor: Georges Rivier, Bron, France

[73] Assignee: Rhone-Progil, Paris, France

[22] Filed: Nov. 21, 1972

[21] Appl. No.: 308,459

[30] Foreign Application Priority Data
Nov. 30, 1971 France .............................. 71.43773

[52] U.S. Cl. ................................. 260/578; 260/580
[51] Int. Cl. ............................................. C07c 87/60
[58] Field of Search ............................. 260/580, 578

[56] References Cited
UNITED STATES PATENTS
2,791,613   5/1957   Pray et al. ............................ 260/580
3,136,818   6/1964   Sperber et al. ....................... 260/580
3,148,217   9/1964   Freyermuth ......................... 260/580

*Primary Examiner*—Lewis Gotts
*Assistant Examiner*—S. P. Williams
*Attorney, Agent, or Firm*—Browdy and Neimark

[57]        ABSTRACT

Tetrachloro aniline is dehalogenated with hydrogen in the presence of a mild or gentle hydrogenation catalyst, such as copper or silver salt, at 280°–420° to produce various chlorinated aniline compounds almost 100% of which are chlorinated at the 3 or meta position.

9 Claims, No Drawings

PROCESS FOR DEHALOGENATION OF POLYHALOGENATED AROMATIC COMPOUNDS

FIELD OF THE INVENTION

The present invention relates to the preparation of halogenated aromatic compounds by dehalogenation of the corresponding derivatives having a greater number of halogen atoms, and, more particularly, the production of meta-substituted chloroanaline, especially 3,5-dichloro aniline, from more highly chlorinated anilines.

BACKGROUND

It has been previously thought that 3,5-dichloro aniline must be prepared by a long and expensive procedure starting from a nitro-aniline which is then chlorinated in order to obtain 1-amino-2,6-dichloro,4-nitrobenzene, after which the amine group is removed and the nitrated product remaining is then reduced. This heretofore sole method for the preparation of 3,5-dichloro aniline is not satisfactory because it is too complicated and too expensive.

However, there have already been described methods for the dehalogenation of various aromatic compounds, particularly in the vapor phase. For example, laboratory tests have been reported wherein chlorobenzenes and chloro-phenols are dehalogenated with hydrogen in the presence of nickel at 270°C; in addition, it was reported that ortho and meta-chloroanilines were treated with hydrogen in the presence of nickel at 200°C. These operations provided, from slightly chlorinated aromatic hydrocarbons, phenols and chloroanilines, a large quantity of the corresponding product free of chlorine, besides the monochlorinated derivative, for example ortho-chlorophenol. From hexachlorobenzene there was produced a mixture of mono, di- and trichlorobenzenes, among which 1,2,4-trichlorobenzenes predominated. Apparently it was difficult to maintain chlorine at the 3 or meta position.

There has also been proposed a dehalogenation process of chloro- and bromophenols with hydrogen in the presence of cuprous chloride on a support, at a temperature between 350° and 550°C, preferably 450° to 480°C. According to an example in which the reaction is conducted on 2,3,4,6-tetrachloro-phenol, the 2,4 and 2,6-dichloro phenols are obtained in major proportion, along with small quantities of phenol, the three monochlorinated isomers and the trichlorophenol isomers having chlorine atoms in the positions 2,3,4- 2,3,6 and 2,4,6. Once again it was difficult to maintain the chlorine at the 3 position.

In general, from these reported experiments it may be noted that there is a tendency to either total dehalogenation or to a partial dehalogenation which appears to be uncontrolled, or which, in most cases, seems to lead particularly to dehalogenated compounds having the halogen atoms in the ortho- and especially the para- positions. These vapor phase experiments carried out in the presence of hydrogen seem to be contrary to the general experience observed in liquid phase dehalogenation, wherein halogen substituting agents situated in the 3 and 5 positions on a benzenic ring were, in some cases, the most stable.

SUMMARY

It is, accordingly, an object of the present invention to obviate the difficulties of the prior art, indicated above.

It is another object of the present invention to provide an improved process of providing polyhalogenated aromatic compounds, particularly a more inexpensive process of providing meta-substituted chloroaniline.

It is another object of the present invention to provide an inexpensive 3,5-dichloroaniline.

It is another object of the present invention to provide a process for dehalogenation of polyhalogenated aromatic compounds to provide less halogenated compounds which are halogenated at the meta- position.

It is another object of the present invention to convert readily available and, little used and inexpensive, tri- and tetrachlorobenzene isomers to tri- and tetrachloroanilines followed by the simple and inexpensive conversion of such tetrachloroanilines to meta chloro substituted anilines, particularly 3,5-dichloroaniline.

These and other objects of the present invention have been surprisingly found to be attainable by a selective dehalogenation, preferentially oriented towards the production of compounds having at least an halogen atom in the meta position and possibly at least an halogen atom in the ortho position with regard to a functional group. While it was already known, as indicated above, that in liquid phase dehalogenation the halogen substituting agents situated in the 3 and 5 positions on a benzenic ring were sometimes the most stable, the prior art discussed above establishes that this theory is not verified when reaction is achieved in vapor phase with hydrogen. Besides, while the literature indicates in a general way that the halogen atom at the ortho position is more labile than the halogen atom in the para position, it has now been observed, on the contrary, in accordance with the present invention that halogen at the para position may be displaced much more quickly than halogen at the ortho position when the process of the present invention is carried out, and, on the whole, the dehalogenation order which appears to have been attained is: halogen atoms in para, ortho, meta position.

Accordingly, the present invention relates to a dehalogenation process of higher halogenated aromatic compounds to provide, preferentially, derivatives having a lower number of halogen atoms, at least one of which is located in the meta position with regard to the functional group of the aromatic compound. This is accomplished, in the vapor phase, by the action of hydrogen on the halogenated aromatic compound, in the presence of at least one catalyst, in either a fixed or fluidized bed, at a temperature of 280°-420°C, and wherein the catalysts are hydrogenation catalysts having gentle or mild action. In particular the process is applicable to the treatment of polyhalogenated aromatic amines.

The following detailed description of specific embodiments of the invention will more generally reveal the nature and advantages of the instant invention as well as further objectives, it being understood that the specific embodiments provided are exemplary and not limitative.

DETAILED DESCRIPTION OF EMBODIMENTS

Selection of raw materials for use in the present invention is dependent upon the final product desired.

For instance, if it is desired to make predominately a product having two halogen atoms in the meta position, the starting raw material should be an aromatic compound having two halogen atoms in the meta position. The presence of at least one halogen atom in the ortho position is necessary if the production of a meta and ortho substituted amine product is desired, although, according to the present invention, it is also possible, if desired, to wholly remove the ortho constituents. The choice of starting material has no other requirements, and it is possible, once the above requirements have been met, to also have recourse to derivatives the ring of which is wholly or partially substituted by halogen atoms.

As indicated above, one of the important advantages of the present process resides in the fact that it permits utilization of some polyhalogenated compounds, particularly polychlorinated compounds, which have not heretofore been extensively used and which are often available. Thus, for example, some seldom used tri- and tetrachlorobenzene isomers, having a low cost, may be converted to tri- and tetrachloroanilines which can then, in accordance with the present invention, be converted to compounds such as 3,5-dichloroaniline and accordingly this product can thus be prepared under much more favorable economic conditions than has been possible in the past. Similar cases of the utilization of polybrominated aromatic starting compounds may also arise.

It should also be clarified that in accordance with the present invention it is not necessary for the starting products to be pure. It is possible to use a starting mixture containing a major proportion of the compound chosen for reaction mixed with other compounds such as polyhalogenated amines which are differently halogenated, or even sub-products. It is also possible to use mixtures of two compounds or more which are intended for production of the desired product.

As indicated above, selection of the catalyst requires some care and the catalyst must be a hydrogenation catalyst having a mild or gentle activity. These types of catalysts are known in the art and their selection will be obvious to the man having normal skill in the art in view of the present disclosure. The term "hydrogenation catalyst having a gentle action" indicates that metals, the great catalytic efficiency of which is well known in this field, such as noble metals or reduced nickel, are generally to be proscribed. In place of such usual catalysts, the present invention utilizes preferably copper or silver in the form of salts such as chlorides, oxides, nitrates, sulfates, chromites, etc. These mild salts may be used either directly in fixed or fluidized beds; or they may be deposited on supports such as silica, alumina, activated carbon, etc. Hydrogenation catalysts or catalytic combinations, the efficiency of which is comparable to the above identified silver or copper salts, may also be used.

The reaction temperature is also an important factor and must be maintained in the range from 280° to 420°C in order to obtain desired selectivity and a convenient conversion rate without notable formation of undesirable products, particularly by degradation and cracking. Inside this range, the preferred temperature depends upon various variables. First, silver derivative catalysts require generally a relatively high temperature, from about 350° to 420°C. On the other hand, copper based catalysts may also be used within the lower portion of the wider range.

The temperature may also be used to control the relative proportions of the finished products. Thus, if it is desired to increase the relative quantity of 3-halogenated and/or 3,5-dihalogenated aniline, it is better to select a temperature slightly higher than if this effect is not desired. This same shifting may be found when starting with a raw material having a more or less great halogenation degree.

Since the reaction is strongly exothermic, it is recommended that heat be removed in order to maintain the reaction medium at a fairly constant selected temperature. In order to accomplish this objective, normal methods are used, such as cooling by means of heat transfer fluids or the like. In order to control the temperature and remove heat as desired, the use of a fluidized bed is particularly desirable since it avoids localized overheating.

The quantity of hydrogen used during the process is not critical except to the extent that a stoichiometrec proportion with regard to the number of halogen atoms desired to be removed must be present. Preferably an excess of hydrogen is used, although this may be either a low or large excess.

The reaction is carried out easily and is very quick, taking at the most only a few seconds and sometimes only a fraction of a second. The reaction may be carried out entirely satisfactorily at atmospheric pressure, although it may also be carried out at either sub or super atmospheric pressures if desired.

According to an optional but especially advantageous feature of the process, the starting polyhalogenated aromatic amines are prepared in situ by introducing into the dehalogenation zone, the polyhalogenated nitrated aromatic compounds used for obtaining such amines; conversion of nitrated derivatives into anilines is very high, and even quantitative. Thus, it is possible to make, in only one stage, the desired relatively slightly halogenated amines, directly from nitrated compounds bearing a greater number of halogen atoms. An example of such an operative mode is, particularly, the manufacture of 3,5-dichloroaniline, from 1-nitro-2,3,4,5-tetrachloro-benzene or from pentachloronitrobenzene.

Practically, an easy way to use the present process consists of introducing hydrogen and the previously vaporized halogenated raw material into the bottom of a reaction zone containing a catalytic bed constituted of particles of a support on which the catalyst is deposited, and brought to reaction temperature which is maintained fairly constant. It is possible, by conveniently regulating the gas introduction rate, to maintain the catalytic bed in a fluidized state. It is advantageous to quickly remove the formed products from the dehalogenation zone in order to avoid secondary reactions and degradation phenomena.

At the reactor outlet, the gas effluent contains halogenated-hydric gas formed during the reaction, generally hydrogen and non-transformed raw material, and the aromatic compounds resulting from the dehalogenation, the major proportion of which is represented by derivatives having halogen in the meta position while the remainder contains various halogenated isomers and, possibly, a low proportion of non-halogenated products and of various impurities; those amines are present, at least partly, as halogenohydrates. In order to separate its constituents, this mixture may be treated by various ways.

An advantageous separation consists first of contacting gas effluent coming from reaction with a liquid or a separating fluid, i.e., a vapor, such as an aliphatic alcohol as methanol, an hydrocarbon such as benzene, or water, at a temperature fairly lower than the effluent, for example at 100°C or less according to the used compound, in order to quickly condense anilines and/or their halogenated-hydrates. Then the various aminated compounds are separated, for example by crystallization. Amines may be recovered in free state if desired, by application of classical methods such as treatment by means of a basic compound such as soda, potash, an alkaline carbonate, etc. It is also possible to liberate amines, then to separate them by crystallization or distillation.

If water is used in these separations, it is additionally advantageous since some amine halogen-hydrates are insoluble in an aqueous medium, while others are soluble; for example, tri- and tetrachloraniline hydrochlorates are practically insoluble while mono- and dichloraniline are soluble. Then an aqueous solution is recovered in which the halogen-hydric gas and some halogen-hydrate anilines are dissolved and which contains, suspended or in precipitate form, insoluble halogen-hydrates. By a simple physical or mechanical operation, such as filtration or centrifugation, separation is then affected between soluble and insoluble products. Afterwards, the solid phase and solu- are treated separately as indicated above, in order to isolate the aminated compounds.

When desired, the non-transformed starting amine or halogen-amines resulting from reaction, but not especially desired — for example, trihalogenated derivatives in the case where dihalogenated derivatives are desired — may advantageously be recycled wholly or partly, to the reaction zone, in which they are again submitted to the dehalogenation process. Recycling may be made either with halogen-hydrates or with free amines.

It is obvious that invention field is not overstepped in adopting a practical utilization mode of process different from the one stated herein- above, or in achieving the treatment of effluent resulting from dehalogenation by any other methods than the ones described hereinabove in an indicative way. Examples hereinafter, given in a non-limitative way, emphasize features and advantages of the process according to the present invention.

EXAMPLE 1

At the bottom of a tubular reactor filled with 100g of alumina grains (size: 20 to 100 microns) impregnated with 10% by weight of cupric chloride, 100g of vaporized 2,3,4,5-tetrachloro aniline and 75 liters of hydrogen are introduced over half an hour. The temperature in the reactor, maintained fairly constant by an heat-transfer fluid, was about 285°C. Contact time of gaseous mixture with catalyst was 4 seconds. From the top of the dehalogenation zone, the reaction effluent passed into a water washing column in which anilines and HCl were removed, while excess hydrogen was permitted to escape to atmosphere. The mass recovered at washing column bottom was then neutralised with soda in order to liberate the organic part which was then analyzed by vapor phase chromatography and thin layer chromatography. Those analyses emphasized that the recovered organic products contained:

| | | |
|---|---|---|
| 2,3,4,5-tetrachloro aniline | 30 | % by weight |
| 2,3,5-trichloro aniline | 40.1 | " |
| 3,4,5-trichloro aniline | 1 | " |
| 3,5-dichloro aniline | 25.3 | " |
| 2,5-dichloro aniline | 0.5 | " |
| 3-chloro aniline | 0.6 | " |

(Q.S. 100: traces of various chlorinated anilines)

As may be observed, selectivity in meta substituted derivatives is almost total and the proportion of chloroaniline bearing a chlorine in para position with regard to amine remaining is extremely low.

EXAMPLE 2

Example 1 was repeated, but in starting this time with 2,3,5,6-tetrachloro aniline and in maintaining, in the reactor, a temperature of about 320°C. Reaction product analysis showed the following results:

| | | |
|---|---|---|
| 2,3,5,6-tetrachloro aniline | 50 | % by weight |
| 2,3,5-trichloro-2,3,5 aniline | 26 | " |
| 2,3,6-trichloro aniline | 0.4 | " |
| 3,5-dichloro aniline | 20.2 | " |
| 2,5-dichloro aniline | 1 | " |
| 3-chloro aniline | 2 | " |

This test shows, that in increasing temperature, the ratio 2,3,5-trichloro aniline to 3,5-dichloro aniline varies in favor of dichlorinated aniline.

EXAMPLE 3

Example 1 was repeated starting with 100g of pentachloraniline, 100 l. of hydrogen at a reaction temperature of 310°C. There was obtained:

| | | |
|---|---|---|
| Pentachlorinated aniline | 29 | % by weight |
| 2,3,5,6 tetrachloro aniline | 32 | " |
| 2,3,4,5 tetrachloro aniline | 1 | " |
| 2,3,5 trichloro aniline | 18 | " |
| 3,4,5 trichloro aniline | 0.8 | " |
| 3,5 dichloro aniline | 18 | " |
| 2,5-dichloro aniline | 0.2 | " |
| 3-chloro aniline | 1 | " |

EXAMPLE 4

Following Example 1 and using 100g of 2,4,5-trichloro aniline, 75 l. of hydrogen, at a reaction temperature of 320°C there was obtained:

| | | |
|---|---|---|
| 2,4,5-trichloro aniline | 48 | % by weight |
| 2,5-dichloro aniline | 33 | " |
| 3-chloro aniline | 19 | " |

It will be observed that in this case also it is possible to control selectivity in order to obtain meta- and meta-ortho substituted derivatives.

EXAMPLE 5

A mixture of anilines resulting from previous treatment of 2,3,4,5-tetrachloro-aniline, was contacted with $H_2$ in accordance with Example 1 at 310°C. This starting mixture had the following composition:

| | | |
|---|---|---|
| 2,3,4,5-tetrachloro aniline | 52 | % by weight |
| 3,4,5-trichloro aniline | 6 | " |
| 2,3,5-trichloro aniline | 38 | " |
| 3,5-dichloro aniline | 4 | " |

After reaction there was obtained:

| | | |
|---|---|---|
| 2,3,4,5-tetrachloro aniline | 14 | % by weight |
| 3,4,5-trichloro aniline | 2.5 | " |
| 2,3,5-trichloro aniline | 51 | " |
| 3,5-dichloro aniline | 29 | " |
| 2,5-dichloro aniline | 1.3 | " |
| 3-chloro aniline | 1.6 | " |

(Q.S. 100: traces of various products).

EXAMPLE 6

This example and the following ones illustrate the variant of preparation in situ of the aromatic amine to be dehalogenated, from convenient available halogenated nitrobenzene. The same device and the same operative mode was used as in Example 1. Initial load constituted 100g of raw 1-nitro, 2,3,4,5-tetrachloro benzene and 90 l. of hydrogen. Reaction temperature was 310°C.

The following organic products were recovered:

| | | |
|---|---|---|
| 2,3,4,5-tetrachloro aniline | 16 | % by weight |
| 2,3,5-trichloro aniline | 33.2 | " |
| 3,5-dichloro aniline | 32.6 | " |
| 2,5-dichloro aniline | 3.0 | " |
| 3-dichloro aniline | 7.4 | " |
| non chlorinated aniline | 0.4 | " |
| 1,2,3,4-tetrachloro benzene | 3.0 | " |

(Q.S. 100: various compounds)

All the advantages of this method, which permits one to obtain in only one stage a large quantity of 3,5-dichloro aniline from tetra-chloronitrobenzene, are readily apparent. It should be noted that the reduction of the nitro group in the starting amine is total.

EXAMPLE 7

Example 6 was repeated, starting this time with 100g of pentachloronitrobenzene and 100 l. of hydrogen, at a reduction temperature of 320°C.

Reaction product contained mainly 11.8% by weight of pentachloraniline, 21.9% of 2,3,5,6-tetrachloro aniline, 14.4% of 2,3,5-trichloro aniline, 33.0% of 3,5-dichloro aniline and 10.2% of 3-chloro aniline.

EXAMPLE 8

Example 6 was repeated using 100g of 1-nitro, 2,4,5-trichloro-benzene and 50 l. of hydrogen at a temperature of 330°C.

Reaction product contained:

| | | |
|---|---|---|
| 2,4,5-trichloro aniline | 50.8 | % by weight |
| 2,5-dichloro aniline | 32.6 | " |
| 3,4-dichloro aniline | 0.3 | " |
| 3-chloro aniline | 16.2 | " |

EXAMPLE 9

The process of Example 6 was repeated, starting with 100g of 1-nitro 2,3,4-trichloro benzene and 90 l. of hydrogen. Reaction temperature was 330°C.
Reaction product contained:

| | | |
|---|---|---|
| 2,3,4-trichloro aniline | 36.8 | % by weight |
| 2,3-dichloro aniline | 29.8 | " |
| 2,4-dichloro aniline | 0.3 | " |
| 3,4-dichloro aniline | 0.9 | " |
| 3-chloro aniline | 31.4 | " |
| non chlorinated aniline | 0.5 | " |

EXAMPLE 10

Over 30 minutes, 100g of 1-nitro 2,3,4,5-tetrachlorobenzene and 90 l. of hydrogen were passed over 100g of alumina grains impregnated at 10% with silver nitrate. Reaction temperature was 410°C.

| | | |
|---|---|---|
| Tetrachloroaniline | 54.7 | % by weight |
| 2,3,5 trichloro aniline | 20.4 | " |
| 3,5-dichloro aniline | 15.3 | " |
| 3-chloro aniline | 0.9 | " |
| 1,2,3,4-tetrachloro benzene | 4.8 | " |

It is to be understood that the invention is not limited to the embodiments disclosed which are offered illustratively and that modifications may be made without departing from the invention.

What is claimed is:

1. A process for the preparation of chlorinated anilines having at least a chlorine atom in the meta position to the amino group, in which tri- to pentachloranilines are dechlorinated, said process consisting essentially of:

reacting in a dechlorination zone, said tri- to pentachloroanilines having at least a chlorine atom in the meta position and at least a chlorine atom in another position, in the vapor phase with hydrogen, in the presence of an hydrogenation catalyst selected from the group consisting of the chlorides, oxides, nitrates, sulfates and chromites of copper or silver, to provide by dechlorination said chlorinated anilines having at least a chlorine atom in the meta position;

and recovering said chlorinated anilines having at least a chlorine atom in the meta position.

2. A process in accordance with claim 1 wherein said catalyst is present in a fixed bed.

3. A process in accordance with claim 1 wherein said catalyst is present in a fluidized bed.

4. A process in accordance with claim 1 wherein said catalyst is deposited on an inert support selected from the group consisting of alumina, silica and activated carbon.

5. A process in accordance with claim 1 wherein said tri- to pentachloroaniline is prepared in situ by introducing into the dechlorination zone a tri- to pentachloro-nitrobenzene used for obtaining said tri- to pentachloro-aniline.

6. A process in accordance with claim 1 wherein said recovery operation consists essentially of contacting the gaseous effluent from the reaction with a liquid or vapor selected from the group consisting of an aliphatic alcohol, an hydrocarbon and water, at a temperature substantially lower than the temperature of said effluent.

7. A process in accordance with claim 6 wherein said liquid or vapor is water at a temperature on the order of 100°C.

8. A process in accordance with claim 1 wherein, said halogenated aniline obtained is 3,5-dichloro aniline.

9. A process for the preparation of chlorinated anilines having at least a chlorine atom in the meta position to the amino group, in which tri- to pentachloroanilines are dechlorinated, said process consisting essentially of:

reacting, in a dechlorination zone, said tri- to pentachloroanilines having at least a chlorine atom in the meta position and at least a chlorine atom in another position, in the vapor phase with hydrogen, in the presence of an hydrogenation catalyst selected from the group consisting of the chlorides, oxides, nitrates, sulphates and chromites of copper and silver, to prepare by dechlorination said chlorinated anilines having at least a chlorine atom in the meta position;

recovering said chlorinated anilines having at least a chlorine atom in the meta- position; and recycling to said dechlorination zone at least a portion of any non-transformed tri- to pentachloroanilines or undesired aniline from which the desired chlorinated aniline having at least a chlorine in the meta- position has been recovered.

* * * * *